Figure 1:
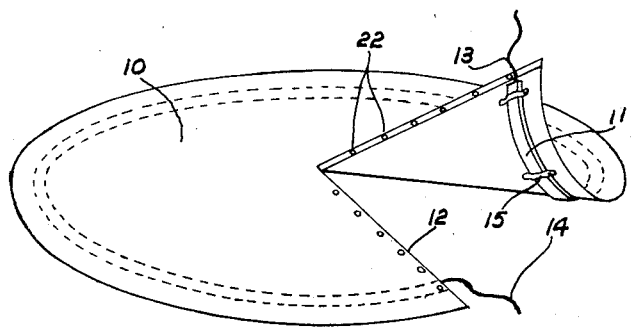

Feb. 27, 1951 N. CORDIS 2,542,996
SILO BLANKET
Filed Nov. 20, 1947

INVENTOR
NAT CORDIS
BY Everett A. Johnson
ATTORNEY

Patented Feb. 27, 1951

2,542,996

UNITED STATES PATENT OFFICE 2,542,996

SILO BLANKET

Nat Cordis, Wilmot, Wis.

Application November 20, 1947, Serial No. 787,203

7 Claims. (Cl. 219—46)

This invention relates in general to fodder coverings and more specifically to a silo blanket.

A silo is a structure for the preservation of green cut fodder known as ensilage. The silos are ordinarily circular in shape and are of substantial height to insure the ensilage's packing solidly, thereby excluding air. Openings are provided, one above the other, on the side of the silo so that the contents can be readily reached as the level drops.

Crops used for ensilage include corn, millet common red and alsike clover, rye, oats, alfalfa, etc. When placed in silos the fodder is usually cut or shredded into short lengths so that it will occupy less space, incorporate less air and undergo less fermentation than when packed uncut. In this way green fodder is preserved in a succulent state during which it undergoes certain changes which generate heat. If the upper layer of ensilage is exposed for any appreciable time, it spoils and hence a small amount, for example, about one or two inches, should be fed each day from the exposed surface.

Heretofore it has been proposed to provide an ensilage unloader which is adapted to rotate within the silo and scrape a portion of the ensilage therefrom and discharge it from the silo. However, in the wintertime, the portion of the ensilage adjacent the silo wall may freeze and it is very difficult to remove a selected amount of ensilage from the entire exposed surface or upper layer of the packed silo. When the freezing occurs, it extends as a solid block for 18 inches to 2 feet along the periphery of the silo. The center portion of the silo, however, does not freeze under normal conditions because of the heat generated by the mass of curing fodder. Obviously, if a portion of the ensilage is frozen hard it becomes difficult to scrape or unload by mechanical means. Therefore, it becomes necessary to enter the silo and use a pickax or the like to dislodge the frozen ensilage. Once it has become necessary to enter the silo to chip out the frozen material, any advantages resulting from the mechanical unloaders are substantially lost.

It is therefore an object of this invention to provide a readily removable blanket adapted to cover the exposed surface of the ensilage within a silo. It is a further object of the invention to provide a silo blanket adapted to maintain a relatively uniform temperature differential between the center of the silo and the walls thereof. Still another object is to provide a method and means whereby freezing of ensilage is avoided while permitting ready access to the normally exposed surface of the fodder. These and other objects of my invention will become apparent to those skilled in the art as the description hereinafter proceeds.

Briefly, I attain the objects of my invention by providing the silo blanket with a flexible annular heating element. The blanket is preferably composed of a heavy duck canvas, is continuous at its periphery, and extends to the wall of the silo. The heating element ordinarily will be disposed at or near the periphery of the blanket.

In one embodiment the blanket comprises a plurality of sections, each comprising a sector of a circle, with readily removable fastening means such as snaps, buttons, zippers, etc., along the edges of the adjacent sectors. If desired, the sectors can be made to overlap each other a distance of 2 or 3 inches along the radii making special fastening devices optional. A blanket of this type can be removed entirely by rolling it about one of the radii or only a portion can be exposed by folding back a specific sector, thereby exposing the surface of the fodder to be removed mechanically or manually. When a mechanical unloader is employed, however, the scraping arm of the loader may be passed under the blanket, permitting the blanket to resume its original position on each revolution. If desired, an enlarged opening at the center of the blanket may be provided to accommodate the loader mechanism.

Inasmuch as a small quantity of ensilage is removed at any one time, it is only necessary to supply sufficient heat to avoid freezing the fodder to a depth of two or three inches. The mass of fodder also generates heat which concentrates near the center of the silo and therefore the heating element should be placed so as to maintain a substantially uniform temperature across the surface of the fodder. Hence the heating element is placed relatively near the periphery of the blanket but may be between about six and eighteen inches from the edge of the blanket.

Figure 2:
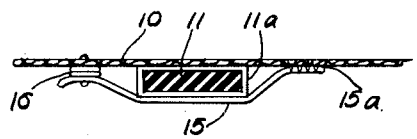

Referring to the drawings, Figure 1 shows a top view of one embodiment of the blanket wherein a continuous circular canvas element 10 is provided near its periphery with a removable flexible heating unit 11 which may be an electrical resistance heating element, preferably of the conductive rubber type. Such a conductive rubber element is compounded with an electrically conducting channel black and is uniquely suited for use in this invention. Thus one suitable type of heating unit comprises an annular strip of conductive rubber 11 sandwiched between two thin layers of plastic 11a as schematically illustrated in Figure 2. In a typical installation the heating unit 11 may be about four inches wide and about fifty feet long. The conductive rubber element is provided with insulated electrical leads 13 and 14 which are connected to opposite ends of the heating unit 11 and form part of an electrical heating circuit such as illustrated in Figure 3.

In Figure 2 is illustrated one means for removably retaining the heating element 11 by the use of a strap 15 fixed at 15a to the blanket 10 and having a fastening device 16. Alternatively a perforated hem can be provided at the periphery of the blanket 10 for supporting the heating unit 11. The support should be so constructed, however, that there is substantially no heat insulating effect by it between the heating unit 11 and the fodder covered by the blanket.

Figure 3:
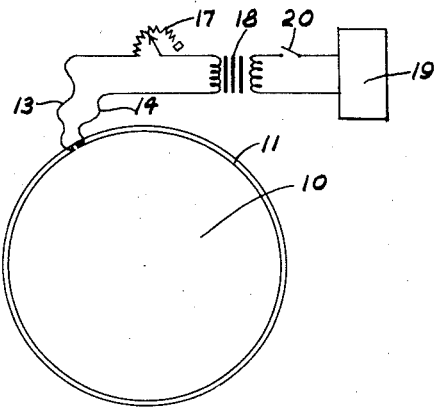

Figure 3 illustrates a simple form of the invention providing a continuous cover 10 and a flexible heating element 11 at its periphery and a typical heating circuit including a current source 19, a transformer 18, a rheostat switch means 17, and an on-off switch 20. If desired, a thermostatic control (not shown) can be placed under the blanket 10 for controlling the heating circuit and in turn the temperature at the surface of the ensilage.

Figure 4:
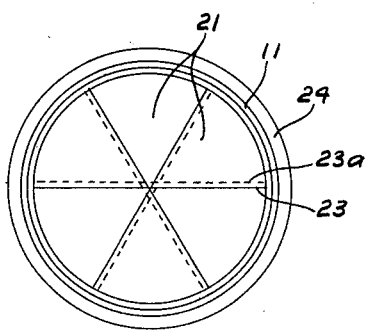

In Figure 4 I have illustrated a heating blanket comprising a plurality of separately movable sectors 21 and having fastening means 22 along the edge 23 and 23a. The sectors 21 are fixed to the annulus 24 which also supports the heating element 11, for example, as described above. It will be apparent that individual sectors 21 may be lifted to expose the fodder. It is also contemplated that the annulus 24 may be removably fixed to a detachable fabric disc instead of the sectors 21. In either case the fodder can be manually removed without disturbing the heating unit.

My invention has been described in connection with the use of a conductive rubber heating element, but it should be understood that other types of flexible resistance heaters might be used. Nevertheless, the flexible conductive rubber is preferred because of its unusual characteristics including durability and corrosion resistance.

It is contemplated that the flexible heated blanket described herein may be employed for other purposes about the farm. For example, when used in smaller sizes and supported by a suitable frame a very satisfactory brooder may be provided. By having the heating element around the periphery of the brooder zone the small fowl do not congregate at any point and thereby I avoid the possibility of trampling or suffocation. Other forms and adaptations will be suggested to those skilled in the art in view of this disclosure.

In view of the above, it should be understood that although the invention is described primarily with reference to specific use and specific construction, I do not intend to be limited by these illustrative embodiments but only by the appended claims.

What I claim is:

1. A silo blanket comprising a substantially circular fabric element, a slit extending radially to a point near the periphery of the said circular element, an electrical heating unit disposed near the periphery of said element, and circuit means for controlling the temperature of said heating unit.

2. The silo blanket of claim 1 wherein the heating unit comprises a curved conductive rubber strip enclosed by an electrically-insulating and heat-conducting plastic.

3. A silo blanket comprising a substantially circular piece of heavy canvas, a radial opening extending from the center of said blanket to the periphery thereof, a conductive rubber heating unit removably disposed about the periphery of said blanket, and fastening means for temporarily closing said opening.

4. A silo blanket comprising an annulus of fabric, a heat producing element carried by said annulus, and a plurality of overlapping fabric sectors extending inwardly from said periphery, the said sectors coacting to cover the area within said annulus.

5. The silo blanket of claim 4 wherein adjacent edges of the sectors are provided with fastening devices.

6. A silo blanket adapted for use in circular silos comprising a flexible, substantially continuous cover, a radial slit in said cover, and a flexible electrical heating unit fixed to the underside of said fabric cover near the periphery thereof, said assembly being adapted to be rolled into a cone-shaped body by rotation about one edge of said slit.

7. A segmented silo blanket comprising a frameless fabric element providing a cover, at least two radially extending openings in said cover dividing the cover into at least two segments, a conductive rubber heating unit removably disposed about the perimeter of said segmented blanket, and fastening means for temporarily closing said radially extending openings.

NAT CORDIS.

REFERENCES CITED

The following references are of record in the file of this patent:

UNITED STATES PATENTS

| Number | Name | Date |
|---|---|---|
| 1,015,991 | Clark | Jan. 30, 1912 |
| 1,188,623 | Cheney | June 27, 1916 |
| 1,275,148 | Friedlein | Aug. 6, 1918 |
| 1,362,351 | Rankin | Dec. 14, 1920 |
| 1,995,302 | Goldstein | Mar. 26, 1935 |
| 2,122,522 | Hughes | July 5, 1938 |
| 2,287,915 | Taylor | June 30, 1942 |
| 2,299,162 | Marick | Oct. 20, 1942 |
| 2,386,095 | Edgar et al. | Oct. 2, 1945 |

FOREIGN PATENTS

| Number | Country | Date |
|---|---|---|
| 490,546 | Great Britain | Aug. 17, 1938 |